(12) United States Patent
Lefort et al.

(10) Patent No.: US 8,340,142 B2
(45) Date of Patent: Dec. 25, 2012

(54) PULSED MICROCHIP LASER

(75) Inventors: Laurent Lefort, Limoges (FR);
Paul-Henri Pioger, Limoges (FR);
Vincent Couderc, Vermeuil-sur-Vienne (FR)

(73) Assignees: Centre National de la Recherche Scientifique - CNRS, Paris (FR);
Universite de Limoges, Limoges (FR);
Horus Laser, Limoges (FR)

( * ) Notice: Subject to any disclaimer, the term of this patent is extended or adjusted under 35 U.S.C. 154(b) by 197 days.

(21) Appl. No.: 12/599,947

(22) PCT Filed: May 14, 2008

(86) PCT No.: PCT/FR2008/000670
§ 371 (c)(1),
(2), (4) Date: Jul. 21, 2010

(87) PCT Pub. No.: WO2008/152251
PCT Pub. Date: Dec. 18, 2008

(65) Prior Publication Data
US 2010/0309936 A1   Dec. 9, 2010

(30) Foreign Application Priority Data
May 14, 2007 (FR) ...................... 07 55065

(51) Int. Cl.
*H01S 3/11* (2006.01)
*H01S 3/113* (2006.01)
*H01S 3/10* (2006.01)

(52) U.S. Cl. ............................... 372/10; 372/11; 372/21

(58) Field of Classification Search ..................... 372/10, 372/11, 21, 26, 66
See application file for complete search history.

(56) References Cited

U.S. PATENT DOCUMENTS
| 4,951,294 | A | 8/1990 | Basu et al. | |
| 7,254,148 | B2 * | 8/2007 | Masuda | 372/29.02 |
| 2003/0039274 | A1 | 2/2003 | Neev et al. | |
| 2007/0064747 | A1 * | 3/2007 | Feve et al. | 372/10 |

FOREIGN PATENT DOCUMENTS
| EP | 0455383 A2 | 11/1991 |
| GB | 1224318 A | 3/1971 |
| WO | WO-97/23932 A1 | 7/1997 |

OTHER PUBLICATIONS

Nettleton J E et al: "Monoblock Laser for a Low-Cost, Eyesafe, Microlaser Range Finder" Applied Optics, OSA, Optical Society of America, Washington, DC, US, vol. 39, No. 15, May 20, 2000, pp. 2428-2432.

* cited by examiner

Primary Examiner — Armando Rodriguez
(74) Attorney, Agent, or Firm — Arent Fox LLP (57) ABSTRACT

The invention relates to a passively triggered microchip laser (1) formed by a cavity closed by an input mirror (4) and an output mirror (5), characterized in that the cavity includes deflection means (9, 10, 11, 12, 13) designed to deflect a light beam (14) between the input mirror (4) and the output mirror (5).

24 Claims, 10 Drawing Sheets

PULSED MICROCHIP LASER

CROSS-REFERENCED TO RELATED APPLICATION

This application is a National Stage entry of International Application No. PCT/FR2008/000670, filed May 14, 2008, which claims priority to French Patent Application 0755065, filed May 14, 2007, the disclosure of the prior application is incorporated in its entirety by reference.

The invention relates to the field of pulsed microchip lasers.

It is known that a microchip laser is a cavity closed by two mirrors, the cavity more particularly including an amplifying laser medium intended to amplify a pump beam.

Microchip lasers are particular lasers wherein Fresnel's length associated to the width of the beam in the gain zone of the amplifying laser medium is greater than the length of the cavity.

For example, for a size of the beam of 50 micrometers in the gain zone of the amplifying laser medium, the length of the cavity is smaller than Fresnel's length, that is about 7.4 millimeters.

The length of the cavity forming a microchip laser is typically smaller than 20 millimeters.

With respect to the other lasers, chip lasers more particularly have the advantage of being low cost devices and make it possible to generate short pulses, typically of the order of a nanosecond.

Because of these constraints as regards the length of the cavity, which is different from the other lasers, microchip lasers have no elements inside the cavity making possible a modification of the transversal dimension of the beam in the cavity. Thus, microchips lasers are, for example, free of lens, curved mirrors, polarisers or intra-cavity modulators.

The invention more particularly relates to a triggered microchip laser also called "Q-switched laser".

It is known that there are two ways to trigger a laser, either actively via the introduction of an externally controlled modulator, or passively using a saturable absorbing medium placed in the cavity.

A microchip laser is only triggered passively because of the hereabove mentioned constraints about length.

The invention thus more particularly relates to a passively triggered microchip laser.

It is known that a saturable absorbing medium is only transparent beyond an intensity threshold corresponding to the whitening of the medium. Thus, such a medium makes it possible to obtain short light pulses in a microchip laser Passively triggered microchip lasers can be either monolithic or non-monolithic.

When they are monolithic, the amplifying laser medium and the saturable absorbing medium form only one single component, for example because they are united by molecular adhesion and/or produced by epitaxial growth. The input and output mirrors are directly placed on this component.

Such monolithic microchip lasers are for example disclosed in the documents EP-A-0742615 or US-A-2007/0064747.

One problem met with such microchip lasers is that the oscillating beam in the cavity goes through a single medium having a substantially constant refractive index.

Then, the beam is propagated in the microchip laser without the natural selection of the output polarisation.

Now, it is advantageous to select a particular polarisation of the beam propagating in the microchip laser to reach a good stability and for applications of wavelength conversion in non linear media.

The technical problem solved by the invention thus consists in supplying a passively triggered microchip laser which enables the control of the polarisation of the laser beam generated by the microchip laser.

This problem is solved by passively triggered microchip laser formed by a cavity closed by an input mirror and an output mirror, characterised in that the cavity includes deflection means arranged to deflect a light beam between the input mirror and the output mirror.

According to the invention, the deflection means enable a selection of a unique polarisation direction.

As a matter of fact, the beam polarisation is preferably transmitted when it is deflected. Then and contrarily to the present microchip lasers, it is possible to determine a unique polarisation direction in the microchip laser.

In addition, the introduction of the selection of the polarisation condition thanks to the deflection means also makes it possible to passively filter wavelengths in the cavity.

The publication "Monoblock laser for a low-cost, eyesafe, microlaser range finder" by Nottieton and al. discloses a laser of the monoblock type for which the Nd:YAG amplifying bar is separated into two parts by a cut zone at Brewster's angle so as to facilitate the linear polarisation in the cavity.

This publication does not teach a pulsed microchip laser as in the invention. On the contrary, according to this document, the mentioned microchips lasers are monolithic or semi-monolithic and have not a sufficient output energy (page 2429 left column). In addition, in this document, the emitted pulses have a pulse duration of more than 25 nanoseconds.

On the contrary, according to the invention, thanks to the utilisation of a microchip laser, the duration of the pulse can be smaller than 5 nanoseconds while enabling a selection of the polarisation.

The original approach on which the invention is founded is thus to have applied a non-monolithic structure, for example of Brewster's type, as in the above-mentioned publication, to a microchip laser whereas everything pushed to supplying monolithic microchip lasers as in the application US-A-2007/0064747.

According to the invention, the pulsed microchip laser of the non-monolithic type, with deflection means such as described hereabove, makes it possible to obtain short pulse duration, typically smaller than nanoseconds, while enabling a selection of polarisation.

Particular embodiments of the invention are described in the sub-claims.

According to one embodiment, the cavity includes, between the input mirror and the output mirror, a separation medium, the deflection means including at least one deflection surface in contact with the separation medium so as to deflect the light beam when it goes through the deflection surface.

Preferably, the input mirror and the output mirror as well as each deflection surface are plane mirrors. This configuration has the advantage of supplying an unstable laser cavity. On the contrary, the arrangement described in the Nottleton and al. publications mentioned above for a monoblock laser supplies a stable cavity because of the presence of a mirror.

The deflection or each deflection surface can be inclined with respect to the input mirror.

More particularly, the or each surface is inclined with respect to the direction of the laser beam propagation according to Brewster's angle.

In addition, the medium on either side of the or each deflection surface can have different refractive indices.

Preferably, the microchip laser includes an amplifying laser medium and a saturable absorbing medium, with the input mirror being capable of transmitting a pump beam, the amplifying laser medium and the saturable absorbing medium being arranged to generate a laser beam from the pump beam, the output mirror being arranged to partially reflect the laser beam.

According to one embodiment, the separation medium can have a refractive index different from the refractive index of the amplifying laser medium and the deflection surface can have a surface of the amplifying laser medium.

According to another embodiment, the separation medium can have a refractive index different from the refractive index of the saturable absorbing medium and the deflection surface can include a surface of the saturable absorbing medium.

In addition, the separation medium can have a refractive index different from the refractive index of the amplifying laser medium and the refractive index of the saturable absorbing medium, and the deflection surfaces can include the surface of the saturable absorbing medium and an amplifying laser medium.

In this case, the section surfaces composed by the surface of the saturable absorbing medium and the amplifying laser medium can be parallel.

The deflection surface can be a surface of a blade transparent to the light beam, and when the amplifying laser medium is separated from the saturable absorbing medium by the separation medium, the transparent blade can be positioned in the separation medium.

According to one embodiment, the or each deflection surface is inclined with respect to the input mirror and more particularly the or each deflection surface is inclined with respect to the direction of propagation of the laser beam according to Brewster's angle.

The propagation direction of the laser beam is perpendicular to the input and output mirrors.

According to one embodiment, the cavity can include a birefringent element arranged so as to form a Lyot-type filter with the deflection means. The birefringent element can be positioned in the separation medium. This embodiment has the advantage of enabling a modification in the polarisation state generated thanks to the deflection means. Thus, it makes it possible to adapt the polarisation of the laser beam to the characteristics desired for the beam.

According to one embodiment, the cavity may include a non linear medium capable of generating new frequencies within the cavity.

In this case, the non linear medium can be positioned between the amplifying laser medium and the saturable absorbing medium or between the saturable absorbing medium and the output mirror.

According to an advantageous embodiment, the amplifying laser medium and the saturable absorbing medium are mounted to be movable with respect to each other. This embodiment makes it possible to modify the characteristics of the microchip laser as a function of the characteristics desired for the laser beam, more particularly as regards the number optical modes of the beam, the emitted power or the repetition frequency.

The invention also relates to a system including a microchip laser such as described hereabove and displacement means arranged to displace the amplifying laser medium and the saturable absorbing means with respect to each other.

Such a system has the advantage of enabling a simple manufacturing of the microchip laser as a function of the characteristics desired for the laser beam and more particularly as regards the number of optical modes of the beam, the power emitted or the repetition frequency.

The invention also relates to a system including a microchip laser such as previously described, an optical pump arranged to longitudinally pump the microchip laser, and pump displacement means arranged for displacing the pump with respect to the microchip laser so as to modify the characteristics of the laser beam emitted at the output of the microchip laser.

The longitudinal pumping makes it possible to modify the characteristics of the output beam by a simple displacement of the pump in a plane parallel to the input mirror.

The invention also relates to a method for generating a laser beam including steps consisting in:
  supplying a microchip laser according to anyone of the claims;
  injecting a light beam into the microchip laser;
  deflecting the light beam into the microchip laser.

The invention will be better understood when reading the appended drawings wherein.

On the preceding figures, identical numbered references refer to identical or similar structural characteristics.

Figure 1:
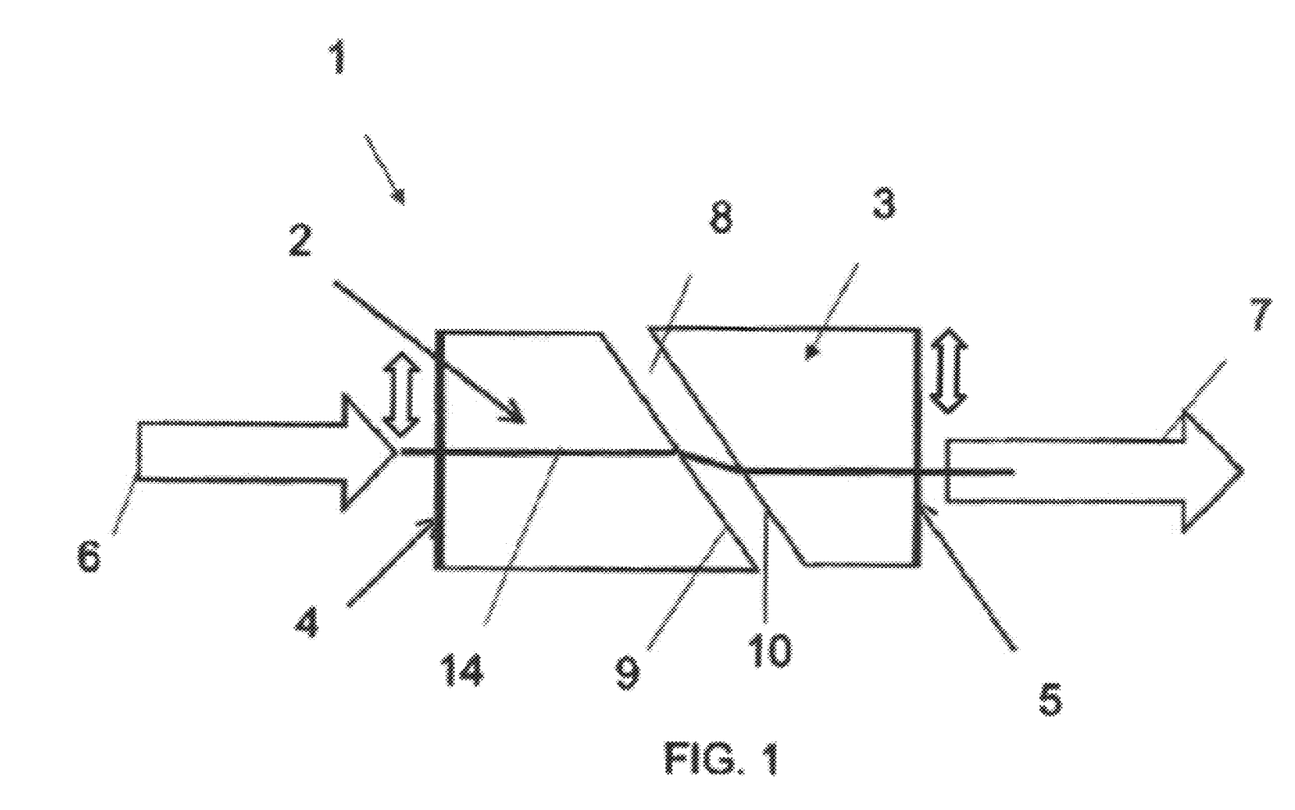
FIG. 1 shows a microchip laser according to a first embodiment of the invention.

While referring to FIG. 1, a microchip laser 1 according to the invention is formed by a cavity closed by an input mirror 4 and an output mirror 5. This cavity is of the unstable type and the input mirror 4 and the output mirror 5 are plane mirrors.

The input mirror 4 is placed on the surface of an amplifying laser medium 2. The amplifying laser medium 2 can be made of a doped material with an isotropic (Nd:YAG) or an anisotropic (Nd:YVO4) structure.

The amplifying laser medium 2 includes a surface 9 gone through by the beam and inclined with respect to the input mirror. This surface 9 is a plane surface.

A separation medium 8 separates the amplifying laser medium 2 from a saturable absorbing medium 3. The inclined surface 9 is in contact with the separation medium.

The separation medium 8 has a refractive index which is different from the refractive index of the amplifying laser medium 2 and can be air.

Because of the presence of this separation medium, the microchip laser 1 according to the invention is non-monolithic.

The saturable absorbing medium 3 can be a saturable absorbing crystal of the chromium doped YAG type currently noted Cr4+:YAG.

The saturable absorbing medium 3 has an inclined surface 10 in contact with the separation medium 8. This inclined surface 10 is a plane surface.

The inclined surface 10 of the saturable absorbing material 3 is substantially parallel to the inclined surface 9 of the amplifying laser medium 2.

The output mirror 5 is placed on the output surface of the saturable absorbing medium 3.

The input mirror 4 and the output mirror 5 are substantially parallel and the surfaces 9 and 10 are inclined with respect to the input mirror 4 and the output mirror 5. Then, when a pump beam 6 is injected substantially perpendicularly to the input mirror 4, the surfaces 9 and 10 are inclined with respect to the beam propagation direction.

The surfaces 9 and 10 are inclined with respect to the laser beam propagation direction along Brewster's angle for the interface between the separation medium 8 and the amplifying 2 and absorbing 3 media.

Since the Nd:YAG crystal forming the amplifying laser medium 2 and the Cr4+:YAG crystal forming the saturable absorbing medium 3 have substantially equal refractive indices, Brewster's angles corresponding to the surfaces 9 and 10 are substantially equal, so that the surfaces 9 and 10 are really substantially parallel.

In operation, a pump beam 6 is injected into the microchip laser 1 through the input mirror 4. The pump beam can be generated by a laser diode and has for example a wavelength of 808 nanometers.

The pump beam propagates in the amplifying laser medium 2 in the form of a rectilinear beam 14.

The amplifying laser medium 2 of the Nd:YAG crystal type amplifies this pump beam 6 and generates an amplified beam to a wavelength about 1064 nanometers. The power of the pump beam is such that it makes it possible to reach the threshold of the laser load.

At the surface 9 of the amplifying laser medium 2, the amplified beam thus generated is deflected, according to the known laws of optics, by Snell's laws.

Since the surface 9 is inclined with respect to the direction of the laser beam propagation along Brewster's angle, a total transmission is performed at the level of the surface 9 for a given polarisation P of the amplified beam incident on surface 9. The other polarisation directions are partially reflected in a direction which is different from that of the beam with polarisation P. Then, the given polarisation P of the amplified beam is selected at the surface 9.

At the surface 10 of the saturable absorbing medium 3, the amplified beam is again deflected. Since the surface 10 is also inclined according to Brewster's angle, the polarisation P is also selected and preferably transmitted in the saturable absorbing medium 3. In addition, the beam transmitted in the saturable absorbing medium 3 is substantially parallel to the pump beam 6 so that the laser pulse 7 generated at the output of the output mirror 5 has a direction substantially parallel to that of the pump beam 6.

In a way known per se, in order to obtain such operation characteristics, the input mirror 4 is arranged so as to transmit the pump beam 6 and to reflect a laser beam which is generated after amplification by the amplifying laser medium 2. In addition, the output mirror 5 is arranged so as to partially reflect the laser beam and to totally reflect the remaining pump beam which would have propagated up to the output mirror 5.

Such characteristics of the mirrors 4 and 5 can be obtained by reflecting or semi-reflecting processing of external faces of the amplifying laser medium 2 and the saturable absorbing means 3.

The total length of the cavity forming the microchip laser 1 is for example between 1 and 20 millimeters. Depending on the width of the beam in the amplifying laser medium 2, Fresnel's length associated to the width of the beam in the gain zone of the amplifying laser medium is greater than the length of the cavity, i.e. the distance between the input mirror 4 and the output mirror 5.

Thanks to the bevelled shape of surfaces 9 and 10, a transversal displacement of the pump beam 6, which means a direction parallel to the input mirror 4, makes it possible to modify the quantity of the amplifying laser medium 2 and the saturable absorbing medium 3 gone through by the beam up to the output mirror 5. Moving the amplifying laser medium 2 and the saturable absorbing medium 3 with respect to one another in a transversal and/or longitudinal way also makes it possible to modify the characteristics of the emitted laser beam.

Then, it is possible, in a very simple way and without restoring the entire microchip laser 1, to modify the characteristics of the emitted laser beam 7. The modification of the characteristics of the output and more particularly the repetition frequency, the pulse duration, energy and peak power can thus be performed as in the application US-A-2007/0064747. The microchip laser 1 according to the invention can thus be associated with an optical pump capable of generating the pump beam, such optical pump including displacement means making it possible to move it with respect to the microchip laser, more particularly in a direction parallel to the input mirror 4.

However, the microchip laser 1 further makes it possible to control the polarisation of the laser beam with respect to the control of the characteristics in the above mentioned document.

Figure 2:
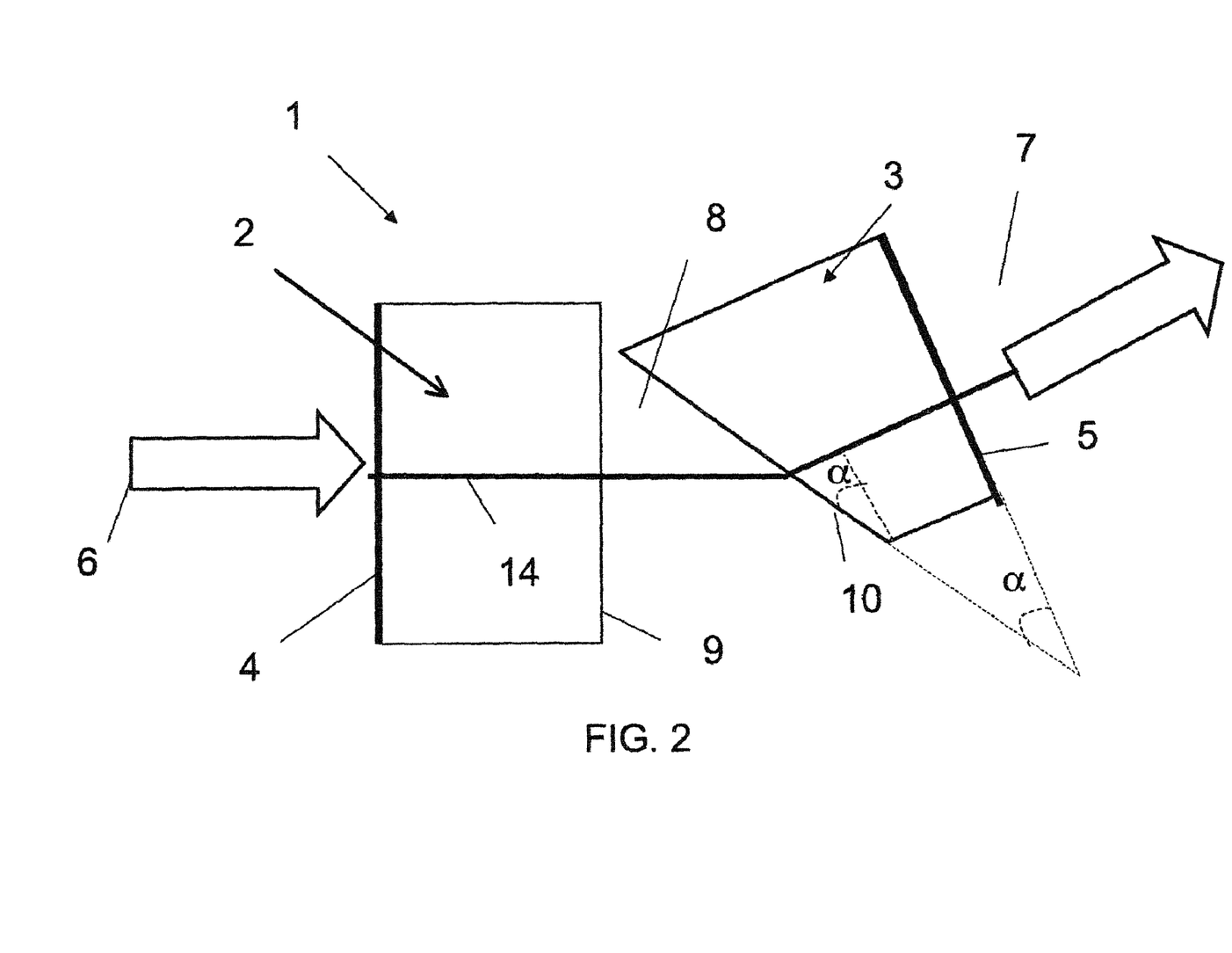
FIG. 2 shows a microchip laser according to a second embodiment of the invention.

While referring to FIG. 2, a second embodiment of the microchip laser 1 according to the invention will now be disclosed.

Like in the embodiment referred to in FIG. 1, the microchip laser 1 includes an amplifying laser medium 2 having an external surface provided with an input mirror 4 transparent to a pump beam 6. It also includes a saturable absorbing medium, 3 having an external surface provided with an output mirror 5. The saturable absorbing medium 3 is separated from the amplifying laser medium 2 by a separation medium 8.

The separation medium 8 can be air. The amplifying laser medium 2 can be doped crystal of the Nd:YAG type. The saturable absorbing medium 3 can be a saturable absorbing crystal of the Cr4+:YAG type.

The separation medium 8 thus has a refractive index which is different from the refractive index of the amplifying laser medium 2 and the saturable absorbing medium 3.

The indices of the amplifying laser medium 2 and saturable absorbing medium 3 are typically between 1.7 and 2.2.

In this second embodiment, the amplifying laser medium 2 has an internal surface 9 parallel to the input mirror 4.

The saturable absorbing medium 3 has an internal surface 10 inclined with respect to the direction of propagation of the laser beam according to Brewster's angle when the pump beam. 6 is injected substantially perpendicularly to the input mirror.

The output mirror 5 is also inclined with respect to the input mirror 4 so as that the deflected beam at the surface 10 of the saturable absorbing medium is incident perpendicularly onto the mirror 5. The inclination angle α of the output mirror 5 with respect to the inclined surface 10 can easily be determined from Brewster's angle corresponding to the inclination of the surface 10 with respect to the direction of the laser beam propagation when the laser beam is injected substantially perpendicularly to the input mirror 4.

In operation, the pump beam 6 is injected in the cavity substantially perpendicularly to the mirror 4 and amplifies the laser beam. Since the surface 9 of the amplifying laser medium is parallel to the mirror 4, no deflection is performed at the surface 9.

The thus amplified beam then propagates in the separation medium 8 and reaches the surface 10 inclined according to Brewster's angle. Because of this inclination, the amplified beam is deflected and reaches the output mirror 5 perpendicularly.

As explained in detail while referring to the first embodiment, because of the deflection at the surface 10 of the saturable absorbing medium, it is possible to select a particular polarisation of the laser beam.

Figure 3:
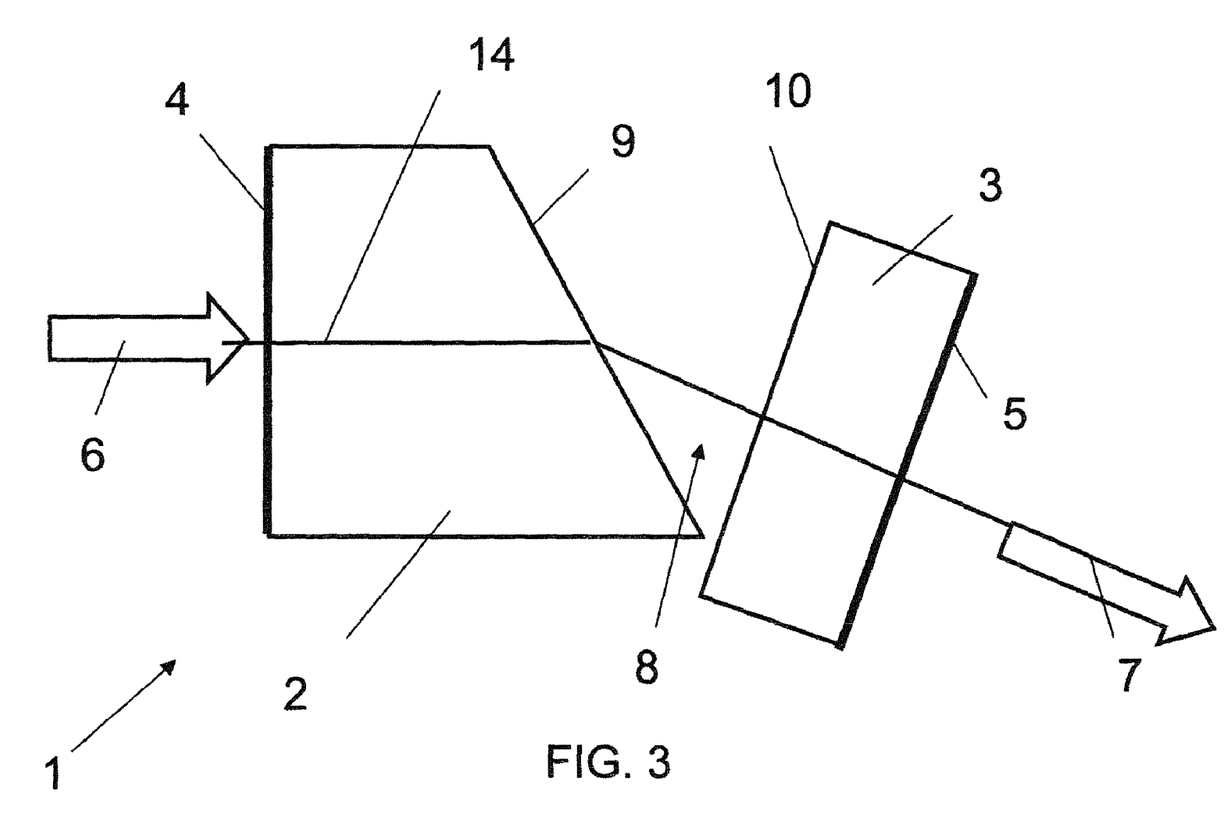
FIG. 3 shows a microchip laser according to a third embodiment of the invention.

While referring to FIG. 3, a third embodiment is described wherein this time, the internal surface 10 of the saturable absorbing medium is parallel to the output mirror 5 and the internal surface 9 of the saturable absorbing medium 2 is inclined with respect to the input mirror according to Brewster's angle. The beam is then deflected when passing through the surface 9 of the amplifying laser medium and then propagates according to a direction which is fixed up to the output mirror 5. In this case, the output mirror is arranged so that the output beam is perpendicular to the output mirror.

In the first three embodiments described in detail hereabove, using the surfaces of the amplifying laser medium 2 and/or the saturable absorbing medium 3 as a deflection means has the additional advantage of enabling a selection of the polarisation while maintaining a compact device since no deflection component, out of the amplifying laser medium 2 and/or a saturable absorbing medium 3 is necessary for the selection of the polarisation.

Now, a fourth embodiment of the microchip laser 1 according to the invention will be described while referring to FIG. 4.

According to this embodiment, the input mirror 4 and the output mirror 5 are parallel and the internal surface 9 of the amplifying laser medium 2 and the internal surface 10 of the saturable absorbing medium are also parallel to mirrors 4 and 5.

A separation medium 8 separates the laser amplifying medium 2 and the saturable absorbing medium 3. This separation medium 8 can be air.

A blade 11 is positioned in this separation medium 8, which has surfaces 12 and 13 respectively facing the amplifying laser medium 2 and the saturable absorbing medium 3.

The surfaces 12 and 13 of the blade 11 are inclined according to Brewster's angle for the material composing the blade 11. The blade 11 is, for example, made of a material of the silica type having a thickness of the order of 1 millimeter. The refractive index of the blade 11 is different from the refractive index of the separation medium 8, so that it allows the deflection of the light beam upon its passage through a surface of the blade 11.

In operation, a pump beam 6 is injected substantially perpendicularly to the input mirror 4. The laser beam is amplified by the amplifying laser medium 2 and is transmitted without any deflection in a rectilinear way in the separation medium 8. At the input surface 12 of the blade 11, the beam is deflected according to Snell's laws. It is also deflected at the output surface 13 of the blade 11. Since the surfaces 12 and 13 are parallel, the beam thus obtained at the blade 11 output reaches the output mirror 5 perpendicularly.

The deflection of the beam at the blade 11 implies a selection of polarisation as explained above. Then, this embodiment also makes it possible to control the polarisation of the laser pulse 7 at the output of the microchip laser 1.

Figure 5:
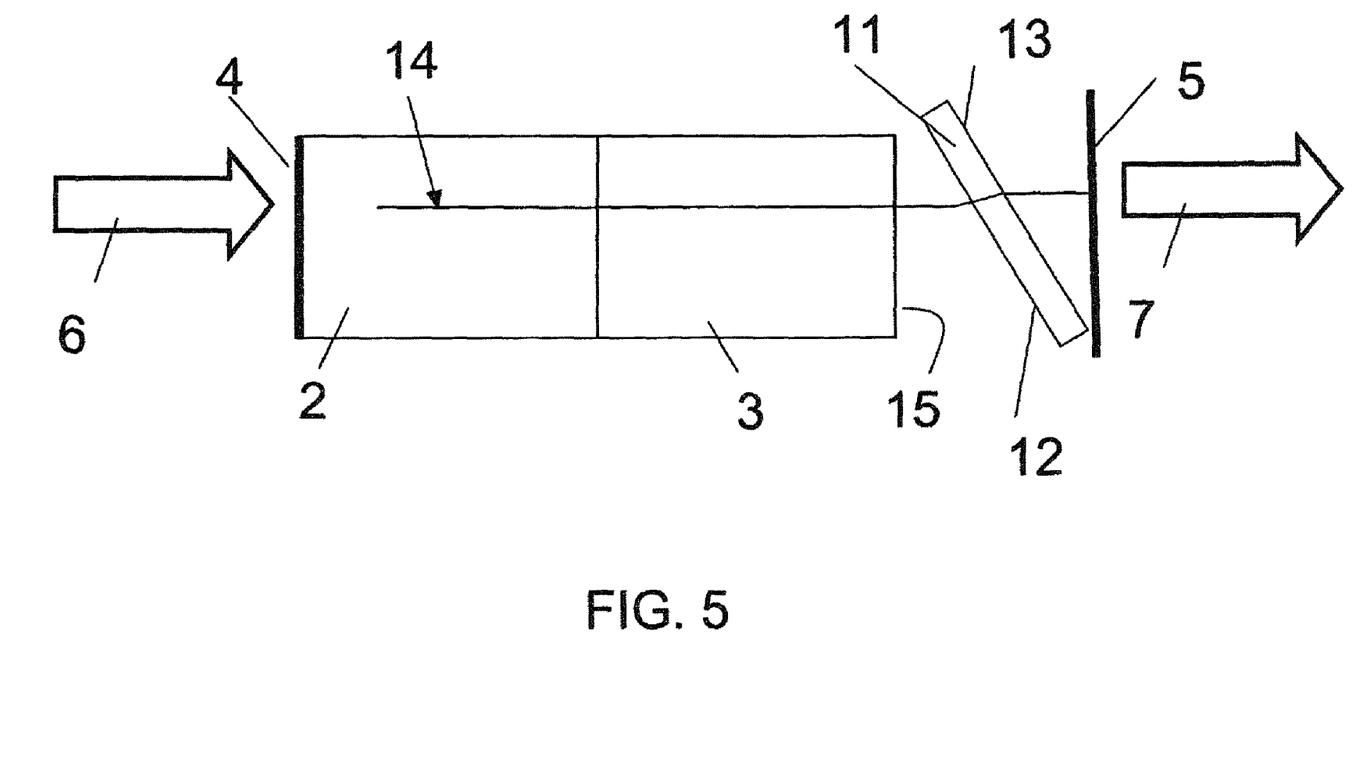
FIG. 5 shows a microchip laser according to a fifth embodiment of the invention.

A fifth embodiment of the microchip laser 1 will now be described while referring to FIG. 5.

In this fifth embodiment, the output mirror 5 is no longer obtained by the treatment of the external surface of the saturable absorbing medium, but constitutes an optical element separated from the saturable absorbing medium by the separation medium 8. The output mirror 5 is held in position by support means (not represented in the figures). The amplifying laser medium 2 and the saturable absorbing medium 3 form a monolithic component, for example by molecular adhesion.

In the separation medium 8, i.e. between the saturable absorbing medium 3 and the output mirror 5, a blade 11 is positioned and inclined according to Brewster's angle with respect to the output mirror 5 and to the input mirror 4 so that, when the beam is injected perpendicularly to the input mirror 4, the blade 11 is inclined with respect to the direction of the laser beam propagation. Similarly, in this arrangement the beam comes out of the microchip laser perpendicularly to the output mirror 5. The output mirror 5 is parallel to the input mirror 4. The external surface 15 of the saturable absorbing medium 3 is parallel to the input mirror 4. The blade 11 of this fifth embodiment has, for example, the same characteristics as the blade 11 described while referring to FIG. 4. More particularly, the refractive index of the blade 11 is different from the refractive index with the separation medium 8, so that it enables the deflection of the light beam when it goes through the surface of the blade 11.

In operation, further to the injection of a pump beam in the microchip laser 1, a light beam 14 propagates in a rectilinear way up to the blade 11 since the external surface 15 is perpendicular to the light beam 14.

Figure 4:
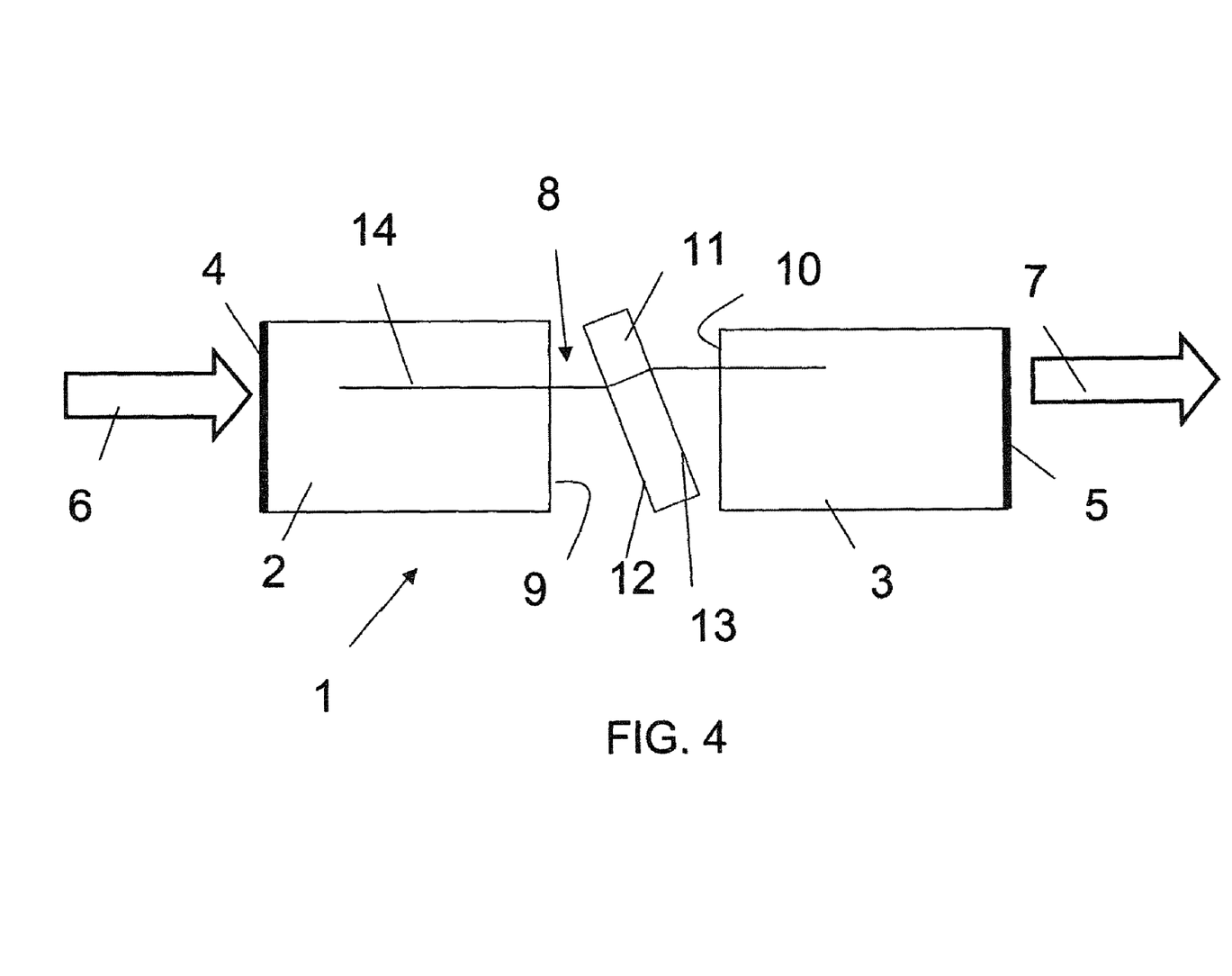
FIG. 4 shows a microchip laser according to a fourth embodiment of the invention.

At the level of the blade 11, the light beam is deflected, as described in reference to FIG. 4. The beam is first deflected by an input surface 12 of the blade 11, the beam propagates in the blade 11 and is again deflected by the output surface 13 of the blade 11, so as to reach the output mirror 5 perpendicularly.

The deflection of the beam at the blade 11 implies, as explained above, a selection of the polarisation. Then, this embodiment also makes it possible to control the polarisation of the laser pulse 7 at the output of the microchip laser 1.

Figure 6:
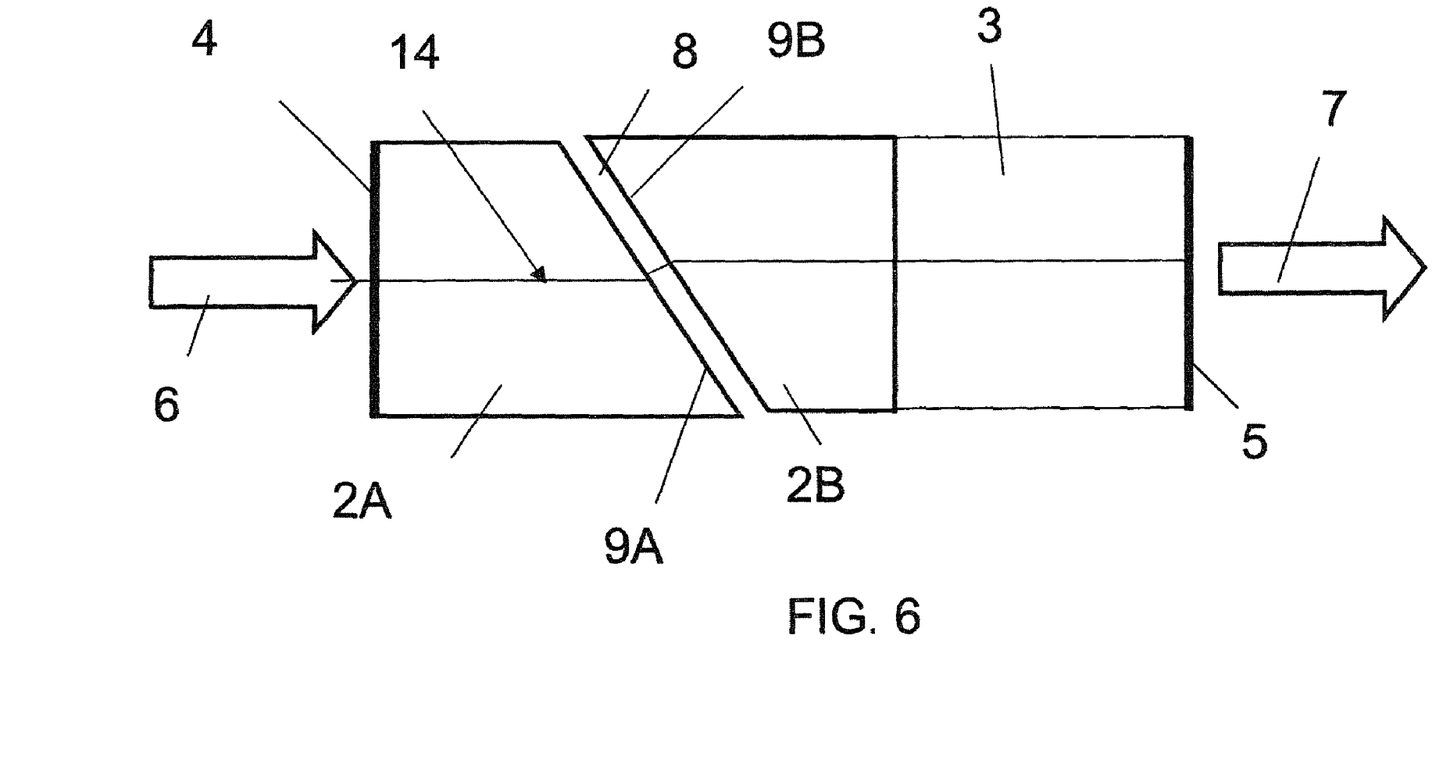
FIG. 6 shows a microchip laser according to a sixth embodiment of the invention.

Now, a sixth embodiment of the microchip laser 1 will be described while referring to FIG. 6.

In this embodiment, the amplifying laser medium is composed of two separate parts 2A and 2B. The two parts 2A and 2B are two doped crystals, for example a Nd:YAG crystal. A separation medium 8, for example air, separates the two parts 2A and 2B.

The refractive index of the media 2A and 2B is different from the refractive index of the separation medium 8.

The parts 2A and 2B respectively include surfaces 9A and 9B arranged with respect to each other like the surfaces 9 and 10 of the first embodiment in reference to FIG. 1. Then, they are parallel and inclined with respect to the input mirror 4. The inclination with respect to the input mirror is such that the surfaces 9A and 9B inclined with respect to the direction of the laser beam propagation along Brewster's angle when the pump beam 6 is injected perpendicularly in the input mirror.

The saturable absorbing medium 3 and the part 2A of the amplifying laser medium form a monolithic component, for example by molecular adhesion. The output mirror 5 is formed by a reflecting treatment on the external surface of the saturable absorbing medium 3.

In operation, a pump beam 6 is injected into the microchip laser substantially perpendicularly to the input mirror 4. This pumping is of the longitudinal type. The laser beam is amplified when going through the first part of the amplifying laser medium 2A. In this first part 2A, it propagates in a rectilinear way. At the level of the inclined surface 9A of the amplifying laser medium 2A, the beam is deflected, propagates in a rectilinear way in the separation medium 8 and reaches the inclined surface 9B of the amplifying laser medium 2B. When it goes through this inclined surface 9B, the beam is also deflected so that it propagates in the amplifying laser medium 2B in a direction substantially identical to direction of the pump beam injection, thus perpendicularly to the mirror 4. In the amplifying laser medium 2B, the beam is again amplified and propagates in a rectilinear way. Then it goes through the saturable absorbing medium 3 and propagates in a rectilinear way up to the output mirror 5.

The deflection of the beam at the surfaces 9A and 9B implies a selection of polarisation, as mentioned above. Then, the embodiment also makes it possible to control the polarisation of the laser pulse 7 at the output of the microchip laser 1.

Figure 7:
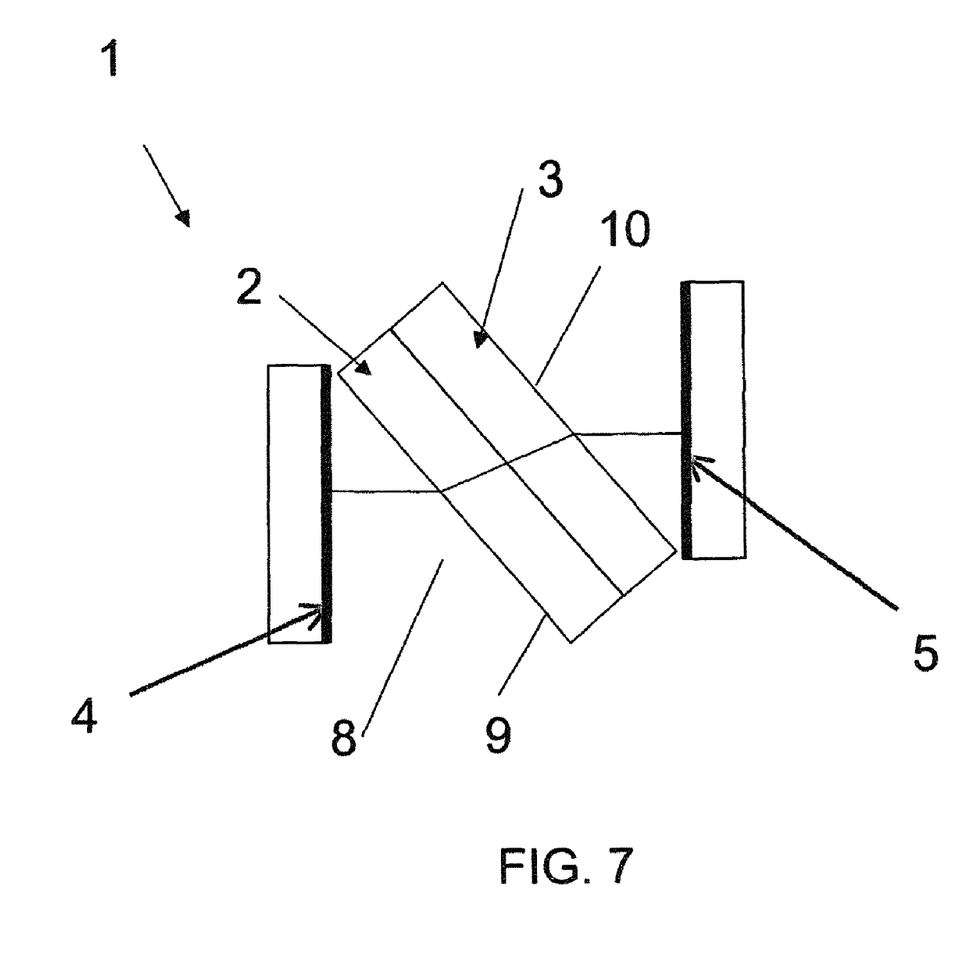
FIG. 7 shows a microchip laser according to a seventh embodiment of the invention.

Now, a seventh embodiment of the microchip laser 1 will be described while referring to FIG. 7.

In this embodiment, the cavity is composed of 6 parts. The input mirror 4 and the output mirror 5 are positioned so as to be substantially parallel. The amplifying laser medium 2 is separated from the input mirror 4 by a separation medium 8 and is inclined according to Brewster's angle with respect to the direction of the laser beam propagation. The saturable absorbing medium 3 and the amplifying laser medium 2 form a monolithic component, for example by molecular adhesion. The face 9 and the face 10 are substantially parallel. The saturable absorbing medium 3 is separated from the output mirror 5 by the separation medium 8.

In operation, a pump beam 6 is injected in the microchip laser substantially perpendicularly to the input mirror 4. The laser beam is amplified when going through the amplifying medium 2. Then, it goes through the saturable absorbing medium 3 in a rectilinear way. When it goes through the inclined surface, then the beam is also deflected so that it is perpendicular to the mirror 5.

The deflection of the beam at the surfaces 9 and 10 implies a selection of the polarisation, as mentioned above. Then, this embodiment also makes it possible to control the polarisation of the laser pulse 7 at the output of the microchip laser 1.

Figure 8:
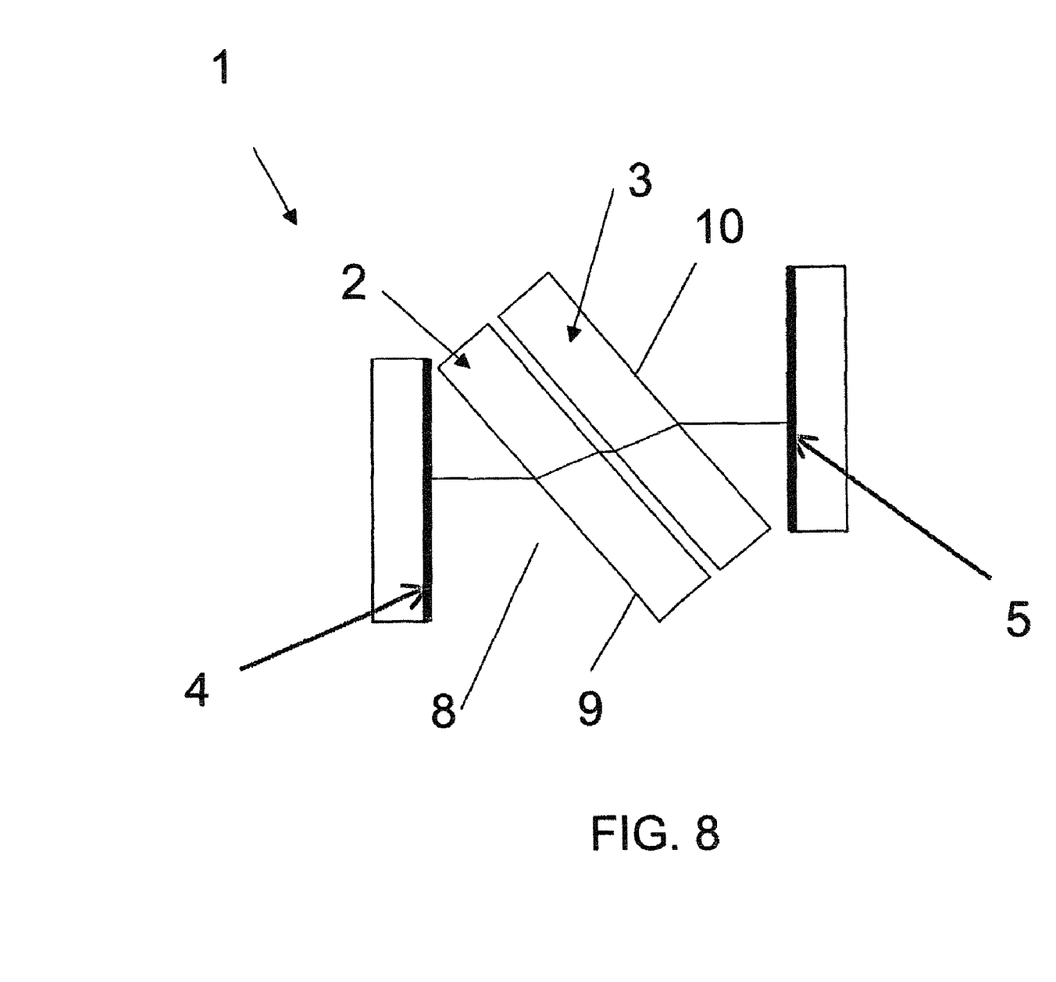
FIG. 8 shows a microchip laser according to an eighth embodiment of the invention.

Now, an eighth embodiment which is an alternative to the seventh embodiment described above will now be described.

In this embodiment, the amplifying laser medium 2 is separated from the saturable absorbing medium 3 by a separation medium 8 with substantially parallel faces.

Now, alternative solutions to the previously described embodiments will be disclosed.

As previously explained, an inclination of the surfaces 9, 9A, 9B and 10 according to Brewster's angle optimizes the selection of polarisation but it should be understood that other inclination are possible for the surfaces 9 and 10 while providing a certain level of selection of the beam polarisation. In all the previous embodiments, the inclination angles of the surfaces for which a light beam is deflected can thus be different from Brewster's angle, so long as the surface is not perpendicular to the direction of the beam propagation.

In addition, an amplifying laser medium 2, 2A, 2B of the doped crystal Nd:YAG type has been described. It should be understood that other media are to be considered such as doped crystals Yb, Er, Yb/Er, Th or Ho. The selection of the doping element depends on the desired wavelength and the matrix of the amplifying laser medium. As regards this matrix, it can be composed of isotropic crystals or crystals with an isotropic orientation such as crystals of the YAG, YVO4 c-cut, GdVO4 c-cut, YIP c-cut, glass or ceramic types. They also can be anisotropic crystals.

In addition, a saturable absorbing medium 3 of the Cr4+: YAG type has been described. It should be understood that other media can be considered such as SESAM, V:YAG, LMA:Co. The selection of the doping element depends on the emitted wavelength.

In addition, inclined surfaces 9, 9A, 9B and 10 are disclosed and they are bevelled. This form for the surfaces has the advantage of being easily obtainable by cutting crystals. However, other forms are possible for these surfaces and more particularly non linearly cut surfaces, so long as the laser beam can be deflected at the surfaces, i.e. they are not perpendicular the direction of the light beam propagation.

In addition, in the embodiment described while referring to FIG. 1, optical components can be positioned in the separation medium 8 since the amplifying laser medium 2 and the saturable absorbing medium 3 are separated by the separation medium 8.

Figure 9:
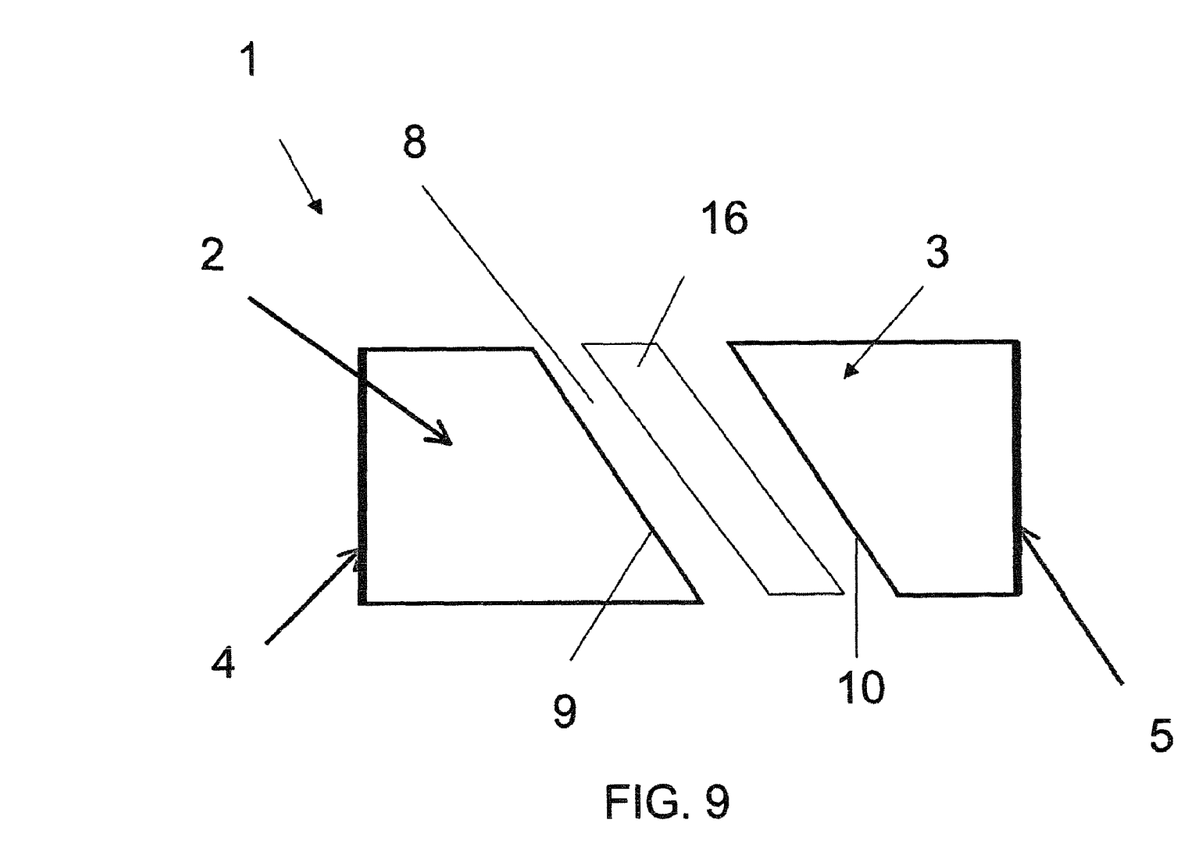
FIG. 9 and FIG. 10 show other embodiments of the invention.

More particularly, FIG. 9 illustrates an embodiment of the invention wherein the microchip laser 1 of FIG. 1 has been modified by adding a birefringent element 16 to form a Lyot type filter between the amplifying laser medium 2 and the saturable absorbing medium 3.

It is known that a Lyot type filter is a frequency filter composed of a birefringent element, i.e. the index of which depends on the field polarisation and a polariser. For example, this filter makes it possible to select a wavelength band. The tuning of the filter is obtained by turning the birefringent element with respect to the polariser. According to the invention, the described deflection means, for example the inclined surfaces of the amplifying laser medium 2 or the saturable absorbing medium 3, enable a selection of the polarisation so that they can perform a function of polarisation of a Lyot type filter. Then, in FIG. 9, the surface 9 in contact with the separation medium 8 enabling a selection of the polarisation, and the birefringent element 16, form a Lyot type filter.

Thus, an incident wave propagating in the birefringent medium of the Lyot type filter, with a direction of its polarisation that is not parallel to a neutral axis of such birefringent element, will be broken down into two radiations propagating on each axis. The different optical path between such two radiations is visible through the modification of the polarisation condition. This difference in path depends on the wavelength, the thickness of the material and the difference in the indices of the axes.

Figure 10:
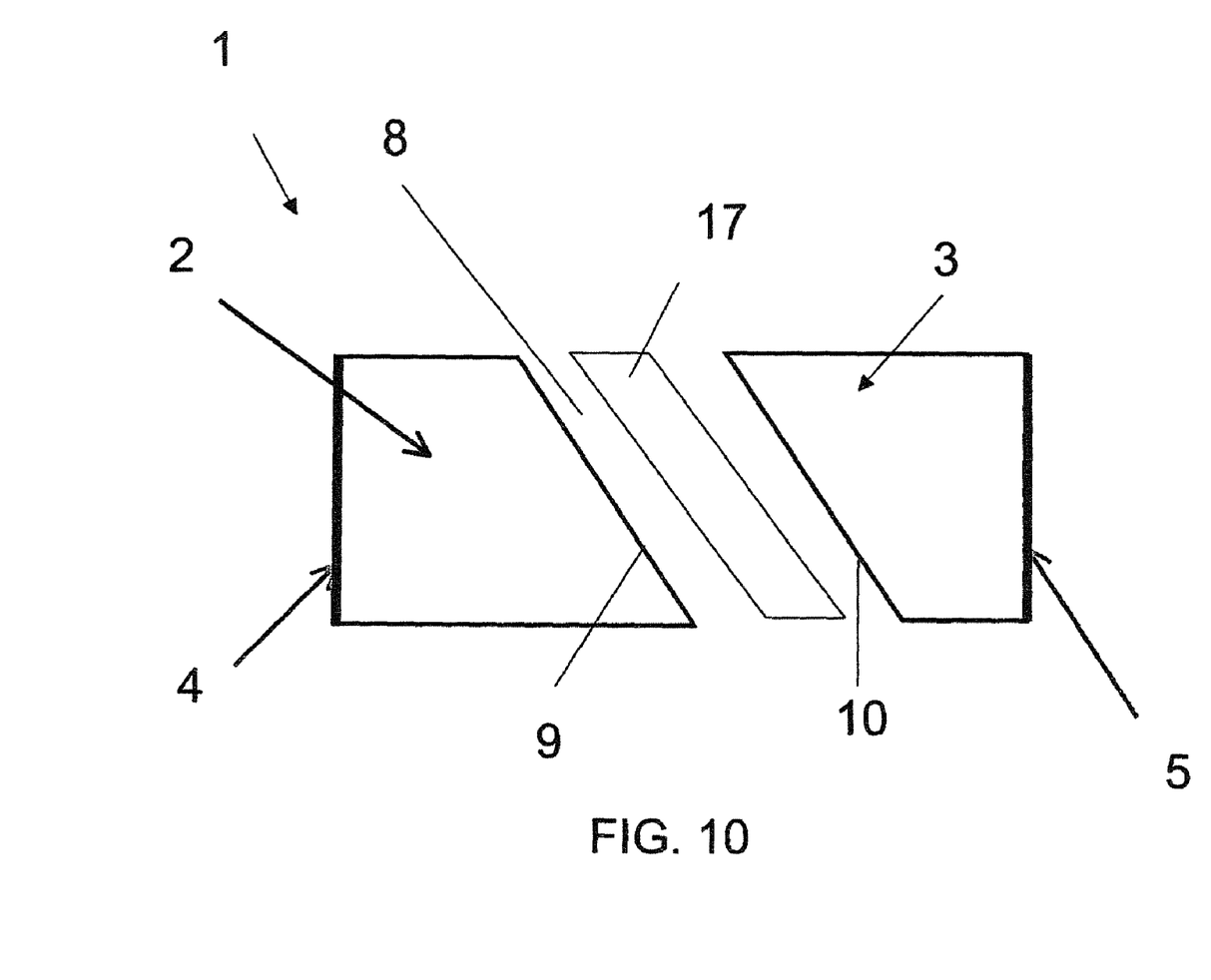

In addition, as illustrated in FIG. 10, the separation medium 8 can also contain a non linear crystal 17 making it possible to generate new frequencies within the microchip laser cavity. This non linear crystal 17 can be a frequency doubler or a crystal generating frequencies by a Raman effect.

In all the previously described embodiments, the microchip laser 1 can be manufactured in a simple way by displacing the amplifying laser medium 2 with respect to the saturable absorbing medium 3 or by displacing the saturable absorbing medium 3 with respect to the amplifying laser medium 2.

When the input and the output mirrors 4 and 5 are directly positioned respectively on the amplifying laser medium 2 and the saturable absorbing medium 3, a displacement of the amplifying laser medium 2 with respect to the saturable absorbing medium 3 causes a variation in the length of the cavity, which enables more particularly to modify the number of longitudinal modes propagating in the cavity.

In all the previously described embodiments, the input mirror 4 and the output mirror 5 are plane mirrors and all the deflection surfaces, more particularly the surfaces 9, 10, 11, 12, 13, 9A and 9B are plane surfaces. This makes it possible to supply an unstable type microchip laser.

The invention claimed is:

1. A passively triggered microchip laser formed by a cavity closed by an input mirror and an output mirror, the cavity including deflection means arranged to deflect a light beam between the input mirror and the output mirror, wherein the input mirror, the output mirror, and the deflection means comprise plane mirrors.

2. A microchip laser according to claim 1, wherein the cavity includes, between the input mirror and the output mirror, a separation medium, with the deflection means including at least one deflection surface in contact with the separation medium so as to deflect the light beam when it goes through the deflection surface.

3. A microchip laser according to claim 2 in which the at least one deflection surface is inclined with respect to the input mirror.

4. A microchip laser according to claim 3, wherein the at least one surface is inclined with respect to the direction of the laser beam propagation according to Brewster's angle.

5. A microchip laser according to claim 2, wherein the media on either side of the at least one deflection surface have different refractive indices.

6. A microchip laser according to claim 1, including an amplifying laser medium and a saturable absorbing medium, the input mirror being capable of transmitting a pump beam, the amplifying laser medium and the saturable absorbing medium being arranged to generate a laser beam from the pump beam, the output mirror being arranged to partially reflect the laser beam.

7. A microchip laser according to claim 6, wherein the cavity includes, between the input mirror and the output mirror, a separation medium with the deflection means including at least one deflection surface in contact with the separation medium so as to deflect the light beam when it goes through the deflection surface, and wherein the separation medium has a refractive index different from the refractive index of the amplifying laser medium, and wherein the deflection surface includes a surface of the amplifying laser medium.

8. A microchip laser according to claim 6, wherein the cavity includes, between the input mirror and the output mirror, a separation medium with the deflection means including at least one deflection surface in contact with the separation medium so as to deflect the light beam when it goes through the deflection surface, and wherein the separation medium has a refractive index different from the refractive index of the saturable absorbing medium and wherein the deflection surface includes a surface of the saturable absorbing medium.

9. A microchip laser according to one of claim 7 or 8, wherein the separation medium has a refractive index different from the refractive index of the amplifying laser medium and the refractive index of the saturable absorbing medium, and wherein the deflection surfaces include a surface of the saturable absorbing medium and a surface of the amplifying laser medium.

10. A microchip laser according to claim 9, wherein the deflection surfaces constituted by the surface of the saturable absorbing medium and the surface of the amplifying laser medium are parallel.

11. A microchip laser according to claim 2, wherein the deflection surface is a surface of a blade transparent to light beam.

12. A microchip laser according to claim 6, wherein the cavity includes, between the input mirror and the output mirror, a separation medium with the deflection means including at least one deflection surface in contact with the separation medium so as to deflect the light beam when it goes through the deflection surface, and wherein the deflection surface is a surface of a blade transparent to light beam and the amplifying laser medium is separated from the saturable absorbing medium by the separation medium, the transparent blade being positioned in the separation medium.

13. A microchip laser according to claim 2, wherein the at least one deflection surface is inclined with respect to the input mirror.

14. A microchip laser according to claim 13, wherein the at least one deflection surface is inclined with respect to the propagation direction of the laser beam in Brewster's angle.

15. A microchip laser according to claim 1, in which the input mirror and the output mirror are parallel.

16. A microchip laser according to claim 6, wherein the cavity includes a birefringent element arranged so as to form, together with the deflection means, a Lyot type filter.

17. A microchip laser according to claim 16, wherein the cavity includes, between the input mirror and the output mirror, a separation medium with the deflection means including at least one deflection surface in contact with the separation medium so as to deflect the light beam when it goes through the deflection surface, and wherein the birefringent element is positioned in the separation medium.

18. A microchip laser according to claim 6, in which the cavity includes a non linear medium capable of generating new frequencies within the cavity.

19. A microchip laser according to claim 18, wherein the non linear medium is positioned between the amplifying laser medium and the saturable absorbing medium.

20. A microchip laser according to claim 18, wherein the non linear medium is positioned between the saturable absorbing medium and the output mirror.

21. A microchip laser according to claim 6, wherein the amplifying laser medium and the saturable absorbing medium are mounted to be movable with respect to each other.

22. A system including a microchip laser according to claim 6, and displacement means arranged for displacing the amplifying laser medium and the saturable absorbing medium with respect to each other.

23. A system including a microchip laser according to claim 1, an optical pump being arranged to longitudinally pump the microchip laser and means for displacing the pump arranged to displace the pump with respect to the microchip laser so as to modify the characteristics of the laser beam emitted at the output of the microchip laser.

24. A method for generating a laser beam including steps comprising:
providing a microchip laser according to claim 1;
injecting a light beam into the microchip laser; and
deviating the light beam within the microchip laser.

* * * * *